United States Patent [19]
Huang

[11] Patent Number: 4,608,729
[45] Date of Patent: Sep. 2, 1986

[54] LOCKABLE STEERING STRUCTURE HAVING A VERTICALLY SLIDABLE LOCKING BLOCK

[76] Inventor: Yung H. Huang, 140-58, Ch'e-lu-Chien, Pao An Ts'un, Jen Te Hsiang, Tainan Hsien, Taiwan

[21] Appl. No.: 665,977

[22] Filed: Oct. 29, 1984

[51] Int. Cl.⁴ .................. B60B 33/02; E05D 11/10
[52] U.S. Cl. .................................. 16/35 R; 16/44; 16/331; 16/353; 280/658
[58] Field of Search .............. 16/35 R, 327, 328, 329, 16/352, 353, 44, 331; 280/89, 644, 658; 403/92, 93, 94, 100, 102

[56] References Cited

U.S. PATENT DOCUMENTS

| | | | |
|---|---|---|---|
| 1,868,342 | 7/1932 | Yorkovitch | 16/353 |
| 2,544,924 | 3/1951 | Herold | 16/35 R X |
| 2,657,938 | 11/1953 | Browne et al. | 16/35 R |
| 3,206,223 | 9/1965 | Frye | 16/35 R X |
| 4,483,042 | 11/1984 | Dieter | 16/35 R |

*Primary Examiner*—Fred Silverberg
*Attorney, Agent, or Firm*—Sheridan Neimark; Karl W. Flocks; A. Fred Starobin

[57] ABSTRACT

A lockable steering structure suitable for the front wheels of a baby cart for children including a grooved block slideable upon T shaped rails attached to both a support frame and a wheel mount so that in a locked position the block engages both rails, so locking the wheel mount to the support frame, and in an unlocked position the block engages only one rail. The block is secured in the unlocked position by a stud which is snap engageable with a recess on the block.

11 Claims, 4 Drawing Figures

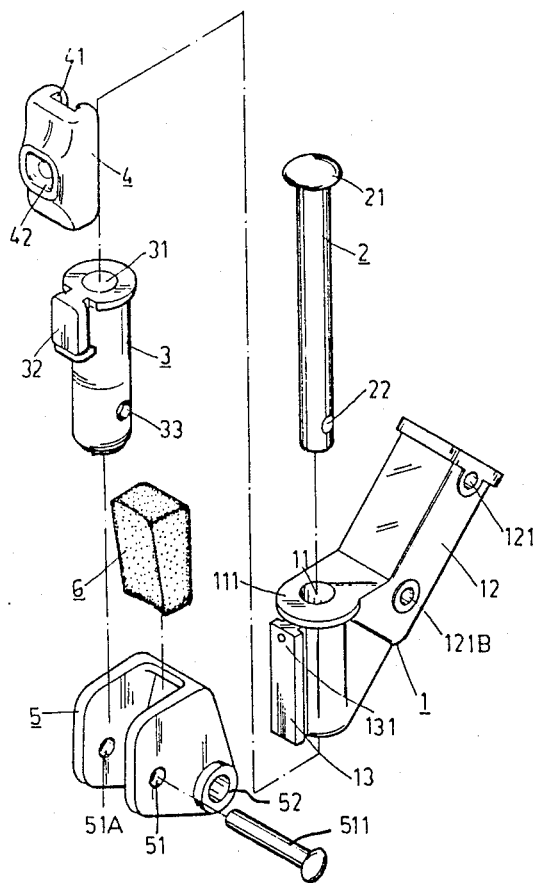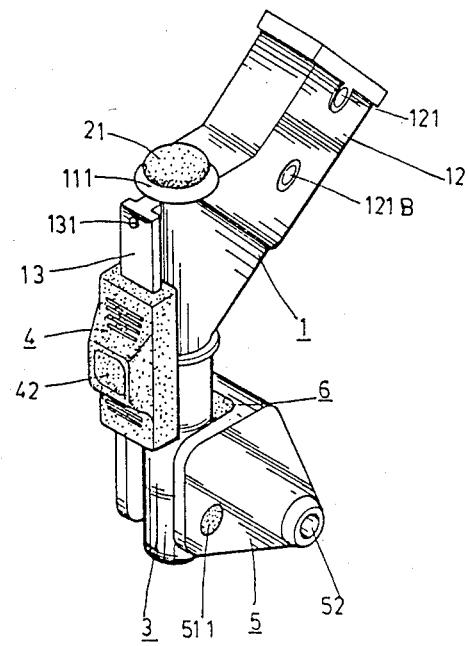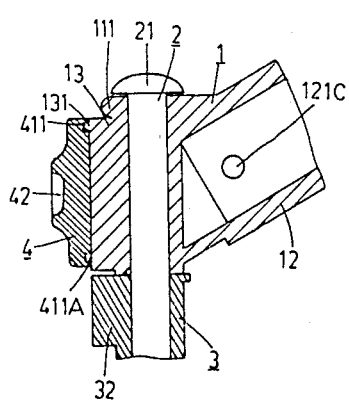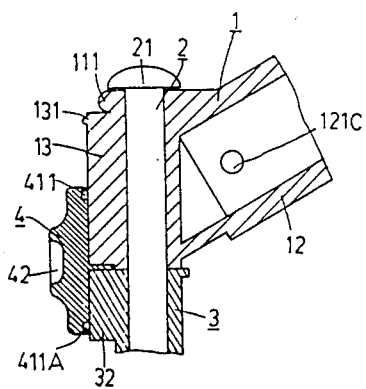
FIG.1
FIG.2
FIG.3B    FIG.3A

LOCKABLE STEERING STRUCTURE HAVING A VERTICALLY SLIDABLE LOCKING BLOCK

The present invention relates to a lockable steering structure for a baby cart.

Steering structures are known for attaching steerable wheels to a baby cart. It is also known to make such structures selectively lockable so that the wheels of the vehicle are then fixedly aligned to adapt to conditions under which steerable wheels are undesirable.

A known steering structure includes a support frame for attachment to the vehicle, a wheel mount pivotally connected to the support frame and locking means for selectively locking the wheel mount relative to the support frame.

Such locking means have hitherto either been of a complex construction or of simple but unreliable construction.

According to the present invention a lockable steering structure includes a support frame for attachment to a vehicle, a wheel mount pivotally connected to the support frame, and locking means for selectively locking the wheel mount relative to the support frame wherein the locking means comprises a first rail of T shape cross section upon the support frame, a second rail of corresponding cross section upon the wheel mount, and a block having a T shaped groove cooperating with the raile and slideable thereupon between a locked position in which the block engages both rails and an unlocked position in which the block engages a single rail.

In a preferred embodiment the locking means includes securing means operative between the block and at least one of the rails whereby accidental movement of the block is resisted.

Conveniently the securing means comprises a stud projecting from a rail and a recess in the block with which the stud is snap engageable. The block thereby is held in position until positively moved by an operator.

In a preferred embodiment the stud projects from the uppermost portion of the first rail and the corresponding recess in the block is adjacent its uppermost portion so that the block encounters the stud only near to its limit of travel and therefore the stud does not otherwise restrict movement of the block.

Advantageously the block has gripping means for ease of hand gripping and preferably has an indentation for thumb engagement.

Preferably the wheel mount comprises a retainer mount pivotally connected to the support frame about a steering axis and a wheel support defining a rolling axis of one or more wheels attachable thereto and hinged to the retainer mount to allow reciprocating vertical movement of the wheels. This vertical movement is damped by a resilient cushion operative between the retainer mount and wheel support so that the cushion is compressed under loading of the vehicle.

Advantageously the rolling axis is perpendicular to and spaced from the steering axis to thereby provide self steering in the unlocked position.

A specific embodiment of the invention will now be described with reference to the accompanying drawings of which FIG. 1 is a three-dimensional analytical perspective of a steering structure according to the present invention for use in a baby cart;

FIG. 2 is a three-dimensional assemblage perspective of the steering structure of FIG. 1, and FIG. 3A is a partial cross-section view of the steering structure of FIGS. 1 and 2 in the locked position, with FIG. 3B in the unlocked position.

Referring to FIG. 1 a steering structure has a support frame 1, a wheel mount comprising a wheel support 5 and a retainer mount 3, a pivot 2, a block 4, and a cushion 6. The steering structure is particularly useful for the front wheels of a baby cart.

A bearing 11 is provided on the support frame 1 to permit fitting of the pivot 2. A hollow, rectangularly formed member 12, integrated to the support frame 1, extends at an upward angle to permit insertion of a leg (not shown) of a baby cart, there being provided two pairs of holes 121, 121A and 121B, 121C on both sides of the hollow member 12, such that the support frame 1 may be fixed to the leg. A first T shape rail 13 is provided on the support frame 1 with a stud 131 on its uppermost portion. The block 4 may be retained in the unlocked position by snap engaging the stud 131 with a recess 411 on the block.

On one upward end of the pivot 2 a round flange 21 is provided which will bear against the outer rim 111 of the bearing 11. The downward tip of the pivot 2 is penetrated by a hole 22 allowing hinged attachment of the wheel support 5 by a hinge pin 511.

The retainer mount 3 is provided with a hole 31 on one end to accommodate fitting of the pivot 2. A T shape rail 32 is provided on the retainer mount corresponding to the T shape rail 13 provided on the support 1.

The block 4 is provided with a T shape groove 41 to be slideable on the T shape rails 13, 32 such that a change in the position of the block 4 will be sufficient to lock the support frame 1 and the retainer mount 3 together. A recess 411 is provided at the uppermost end of the groove such that recess 411 will be in a position to accommodate the stud 131 as provided on the terminal section of T shape rail when the block 4 slides to reach the terminal end of T shape rail 13 whereupon the block 4 will become fixed to the frame support 1. A thumb grip 42 is provided thereupon to facilitate manual movement of the block.

The wheel support 5 is composed of two symmetrically structured linked brackets and by virtue of a pair of corresponding holes 51, 51A provided on either bracket, a bolt pin 511 can secure the brackets to the outside of the retainer mount 3 by penetration therethrough to reach hole 22 provided on the terminal end of pivot 2 across the axial hole 33 relative to the support frame 3.

The wheel support 5 may thereby be hinged to the retainer mount 3 whilst another pair of corresponding holes 52, 52A are also provided for receiving an axle and thereby defining a rolling axis.

The cushion 6 is made of supple but sufficiently tough material, fitted between the retainer mount 3 and the wheel support 5 to absorb shock.

The rolling axis is spaced from the pivot 2 so as to provide automatic steering of the wheel mount in the unlocked position as the baby chart changes direction.

In use, when it is desired to fix the direction of progression of the front wheel, an operator engages the block 4 across both the T shape rails 13 and 32 as shown in FIG. 3A so that the support frame 1 is united with the retainer mount 3. When this takes place, then the wheel support 5 is secured to the retainer mount 3 and will be aligned in a fixed steering direction. Where it is desired to allow the front wheel to steer freely, an operator displaces the block 4 to the terminal end of the T shape rail 13 associated with frame support 1 in order that the stud 131 is engaged into the recess cavity 411 incorporated in the block 4 as shown in FIG. 3B.

While a specific embodiment of the invention has been shown and described in detail to illustrate the application of the principles of the invention, it will be understood that the invention may be embodied otherwise without departing from such principles.

I claim:

1. A lockable wheel structure for use on a wheeled baby cart to support the baby cart on the wheels comprising
    a frame support having an extending portion for attachment to the baby cart and a substantially vertical portion attached to said extending portion, said substantially vertical portion having a penetration hole therethrough and a first T shaped rail along an outer surface of said vertical portion associated in direction with said penetration hole, and an engaging means adjacent to an upper terminal end of said first T shaped rail;
    a rotation shaft fitted into said penetration hole and extending therethrough;
    a bearing mount located below the frame support and having a hole therein to receive an end portion of said rotation shaft and thus said bearing mount is mounted on said rotation shaft, and a second T shaped rail, similarly structured to said first rail, along an outer surface of said bearing mount and vertically aligned with said first T shaped rail when the cart moves in a forward direction;
    a wheel support locked to said bearing mount for movement therewith and attached to the wheels of the baby cart;
    a block having a groove complementary to said T shaped rails for vertical sliding movement of said block along said T shaped rails and having a complementary engaging means to enable engagement of said complementary engaging means with said engaging means of said first T shaped rail
    whereby said wheel support having said wheels attached thereto rotates freely relative to said bearing mount when said block is positioned with said complementary groove only engaging said first rail and said complementary engaging means is contacting said engaging means of said first T shaped rail, and the wheels attached to said wheel support are locked in their direction of travel when the rails are vertically aligned and said block is slidably positioned with said complementary groove engaging both said first and said second rail simultaneously.

2. The lockable wheel structure of claim 1 wherein said engaging means of said first T shaped rail is a bulging nose adjacent the terminal end of said rail, and said complementary engaging means on said block is a recess into which said bulging nose is received to hold said block steadfast in position to allow free rotation of said wheel support relative to said frame support.

3. A lockable steering structure including a support frame for attachment to a vehicle, a wheel mount pivotally connected to the support frame, and locking means for selectively locking the wheel mount relative to the support frame wherein the locking means comprises a first rail of T shape cross section upon the support frame, a second rail of T shape cross section located below the first rail upon the wheel mount and movable into and out of vertical alignment with said first said, and a block having a T shaped groove cooperating with the rails and being vertically slidable thereupon between a locked position in which the block engages both rails when the rails are vertically aligned and an unlocked position in which the block engages only the first rail.

4. A lockable steering structure as claimed in claim 3, wherein the locking means includes securing means operative between the block and at least one of the rails whereby accidental movement of the block is resisted.

5. A lockable steering structure as claimed in claim 4, wherein the structure means comprises a stud projecting from a rail and a recess in the block with which the stud is snap engageable.

6. A lockable steering structure as claimed in claim 5, wherein the stud projects from the uppermost portion of the first rail and the corresponding recess in the block is adjacent its uppermost portion.

7. A lockable steering structure as claimed in claim 3, wherein the block includes gripping means adapted for hand gripping of the block.

8. A lockable steering structure as claimed in claim 7, wherein the gripping means includes an indentation on the block for thumb engagement.

9. A lockable steering structure as claimed in claim 3, wherein the wheel mount comprises a retainer mount pivotally connected to the support frame about a steering axis and a wheel support defining a rolling axis of one or more wheels attachable thereto and hinged to the retainer mount to allow reciprocating vertical movement of the rolling axis.

10. A lockable steering structure as claimed in claim 9, wherein a vertical movement of the rolling axis is damped by a resilient cushion operative between the retainer mount and the wheel support.

11. A lockable steering structure as claimed in claim 9, wherein the rolling axis is perpendicular to and spaced from the steering axis to thereby provide self steering in the unlocked position.

* * * * *